United States Patent
Noguchi

(10) Patent No.: US 9,253,403 B2
(45) Date of Patent: Feb. 2, 2016

(54) IMAGE STABILIZATION APPARATUS, CONTROL METHOD THEREFOR, STORAGE MEDIUM STORING CONTROL PROGRAM THEREFOR, AND IMAGE PICKUP APPARATUS EQUIPPED WITH IMAGE STABILIZATION APPARATUS

(71) Applicant: CANON KABUSHIKI KAISHA, Tokyo (JP)

(72) Inventor: Masaaki Noguchi, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/451,494

(22) Filed: Aug. 5, 2014

(65) Prior Publication Data
US 2015/0042827 A1 Feb. 12, 2015

(30) Foreign Application Priority Data

Aug. 7, 2013 (JP) .................................. 2013-164132
Jul. 14, 2014 (JP) .................................. 2014-144216

(51) Int. Cl.
*H04N 5/232* (2006.01)

(52) U.S. Cl.
CPC ....... *H04N 5/23287* (2013.01); *H04N 5/23245* (2013.01); *H04N 5/23248* (2013.01); *H04N 5/23258* (2013.01); *G03B 2205/0015* (2013.01)

(58) Field of Classification Search
None
See application file for complete search history.

(56) References Cited

U.S. PATENT DOCUMENTS

| | | | | |
|---|---|---|---|---|
| 5,940,631 A * | 8/1999 | Hirano et al. | | 396/55 |
| 6,091,448 A * | 7/2000 | Washisu et al. | | 348/208.16 |
| 6,097,895 A * | 8/2000 | Furuyama | | 396/55 |
| 7,164,853 B2 * | 1/2007 | Tomita | | 396/55 |
| 7,710,458 B2 * | 5/2010 | Yuyama et al. | | 348/208.4 |
| 7,830,415 B2 * | 11/2010 | Nakahara | | 348/208.99 |
| 7,983,547 B2 * | 7/2011 | Miyasako | | 396/55 |
| 8,175,448 B2 * | 5/2012 | Miyasako | | 396/55 |
| 8,570,385 B2 * | 10/2013 | Yamada et al. | | 348/208.6 |
| 8,611,733 B2 * | 12/2013 | Ohishi | | 396/55 |
| 8,792,038 B2 * | 7/2014 | Noguchi | | 348/333.02 |
| 2004/0263635 A1 * | 12/2004 | Katagiri et al. | | 348/208.15 |

(Continued)

FOREIGN PATENT DOCUMENTS

GB 2514657 A 12/2014
JP 2013-033160 A 2/2013

OTHER PUBLICATIONS

GB Search and Examination Report issued in corresponding application No. GB1413904.2, dated Feb. 25, 2015.

*Primary Examiner* — Michael Osinski
(74) *Attorney, Agent, or Firm* — Rossi, Kimms & McDowell LLP

(57) ABSTRACT

An image stabilization (IS) apparatus that is capable of preventing change of a field angle due to unnecessary mode transition. A selection unit transfers from a first IS mode to a second IS mode with a larger IS effect when a detected shake amount is maintained below a first threshold beyond first determination time and the shake amount is not maintained below a second threshold that is lower than the first threshold beyond a third determination time that is shorter than a second determination time, and transfers from the first IS mode to a third IS mode with the smallest IS effect when the shake amount is maintained below the second threshold beyond the second determination time that is shorter than the first determination time. A control unit controls an IS unit that corrects an image blur using the shake amount in the selected IS mode.

15 Claims, 8 Drawing Sheets

(56) References Cited

U.S. PATENT DOCUMENTS

| | | |
|---|---|---|
| 2005/0052538 A1* | 3/2005 | Sato et al. .................. 348/208.1 |
| 2005/0168586 A1* | 8/2005 | Tsubusaki ................ 348/208.99 |
| 2006/0051081 A1* | 3/2006 | Ogino ............................ 396/55 |
| 2006/0132612 A1* | 6/2006 | Kawahara .................. 348/208.6 |
| 2006/0284984 A1* | 12/2006 | Takemoto et al. ....... 348/208.99 |
| 2006/0285007 A1* | 12/2006 | Yuyama et al. ............... 348/362 |
| 2007/0122134 A1* | 5/2007 | Suzuki ........................... 396/55 |
| 2007/0132856 A1* | 6/2007 | Saito et al. .............. 348/208.99 |
| 2008/0037970 A1* | 2/2008 | Saito et al. ..................... 396/55 |
| 2008/0204565 A1* | 8/2008 | Yumiki .................... 348/208.99 |
| 2008/0260375 A1* | 10/2008 | Yumiki ......................... 396/263 |
| 2009/0040357 A1* | 2/2009 | Ichii et al. ................ 348/333.02 |
| 2009/0128640 A1* | 5/2009 | Yumiki ..................... 348/208.6 |
| 2010/0134644 A1* | 6/2010 | Kita ........................... 348/222.1 |
| 2010/0158493 A1* | 6/2010 | Miyasako ...................... 396/55 |
| 2010/0194897 A1* | 8/2010 | Yumiki ...................... 348/208.4 |
| 2011/0105181 A1* | 5/2011 | McLeod ................... 455/556.1 |
| 2011/0115929 A1* | 5/2011 | Noguchi .................... 348/208.4 |
| 2011/0115940 A1* | 5/2011 | Ojima et al. .............. 348/222.1 |
| 2011/0298937 A1 | 12/2011 | Ogawa et al. |
| 2012/0154615 A1* | 6/2012 | Noguchi .................... 348/208.6 |
| 2012/0188394 A1* | 7/2012 | Park et al. ................. 348/222.1 |
| 2012/0201426 A1* | 8/2012 | Jasinski et al. ................ 382/107 |
| 2013/0034345 A1 | 2/2013 | Miyahara |
| 2013/0044229 A1* | 2/2013 | Noguchi .................... 348/208.6 |
| 2013/0063651 A1* | 3/2013 | Yoshioka et al. ............. 348/353 |
| 2014/0125828 A1* | 5/2014 | Takeuchi ................. 348/208.99 |
| 2014/0285677 A1* | 9/2014 | Fujita et al. ................ 348/208.6 |

* cited by examiner

IMAGE STABILIZATION APPARATUS, CONTROL METHOD THEREFOR, STORAGE MEDIUM STORING CONTROL PROGRAM THEREFOR, AND IMAGE PICKUP APPARATUS EQUIPPED WITH IMAGE STABILIZATION APPARATUS

BACKGROUND OF THE INVENTION

1. Field of the Invention

The present invention relates to an image stabilization apparatus, a control method therefor, a storage medium storing a control program therefor, and an image pickup apparatus equipped with the image stabilization apparatus.

2. Description of the Related Art

There is a known image pickup apparatus equipped with an image stabilization apparatus that detects a shake of the image pickup apparatus due to a hand shake etc. and controls to drive a taking lens to correct an image blur caused by the detected shake. Furthermore, there is an image stabilization apparatus that corrects not only an image blur concerning an angle but also an image blur due to a parallel movement caused when the image pickup apparatus moves in parallel.

Moreover, there is an image stabilization apparatus that increases an image stabilization effect for a large hand shake occurring while shooting in walking by broadening an image stabilization range at a wide-angle end side when shooting video, for example.

In addition, there is an image stabilization apparatus that broadens an image stabilization frequency band so as to particularly correct an image blur at a low frequency side caused by a body shake or the like when a shake amount is small during a fixed point shooting (see Japanese Laid-Open Patent Publication No. 2013-33160 (JP2013-33160A): an image stabilization mode using this image stabilization is called a fixed pint shooting mode).

Furthermore, there is an image stabilization apparatus that stops image stabilization to prevent a malfunction of an angular velocity sensor due to a low-band shake when there is mostly no shake because the image pickup apparatus is set to a tripod (an image stabilization mode using this image stabilization is called a tripod mode).

Then, there is an image stabilization apparatus in which the above-mentioned image stabilization modes are set beforehand, and the optimal image stabilization mode is automatically selected from these image stabilization modes according to a shooting condition to perform the image stabilization control.

Incidentally, it is assumed that the image pickup apparatus equipped with the image stabilization apparatus disclosed in the above-mentioned document is moved rapidly by shaking the image pickup apparatus, for example, and then is put on a desk to be in a static state. In this case, the image stabilization apparatus may enter the fixed point shooting mode that strengthens the image stabilization effect when a shake amount threshold is large but a shake amount is small in comparison with the tripod mode, before entering the tripod mode that stops image stabilization by fixing a shift lens for image stabilization when the shake amount is small.

When entering the fixed point shooting mode that is an unnecessary image stabilization mode before entering the tripod mode, the image stabilization apparatus will correct a slow swing back, which causes a problem of changing a field angle as a result.

SUMMARY OF THE INVENTION

The present invention provides an image stabilization apparatus, a control method therefor, a storage medium storing a control program therefor, and an image pickup apparatus equipped with the image stabilization apparatus, which are capable of preventing change of a field angle due to unnecessary mode transition when an image stabilization mode is selected from among a plurality of image stabilization modes according to a shake amount of the image pickup apparatus.

Accordingly, a first aspect of the present invention provides an image stabilization apparatus comprising a shake detection unit configured to detect a shake amount of an image pickup apparatus, an image stabilization unit configured to correct an image blur using an output signal outputted from the shake detection unit, a selection unit configured to select one image stabilization mode from among at least three image stabilization modes including a first image stabilization mode, a second image stabilization mode, and a third image stabilization mode, and a control unit configured to control the image stabilization unit according to the image stabilization mode selected by the selection unit. An image stabilization effect of the second image stabilization mode is larger than an image stabilization effect of the first image stabilization mode, and the image stabilization effect of the first image stabilization mode is larger than an image stabilization effect of the third image stabilization mode. A first determination mode that determines whether a state, where amplitude of the shake amount is not higher than a first threshold, is maintained beyond first determination time is provided. A second determination mode that determines whether a state, where the amplitude of the shake amount is not higher than a second threshold that is smaller than the first threshold, is maintained beyond second determination time that is shorter than the first determination time is provided. The selection unit transfers the mode from the first image stabilization mode to the second image stabilization mode when the determination by the first determination mode is maintained beyond the first determination time. The selection unit transfers the mode from the first image stabilization mode to the third image stabilization mode when the determination by the second determination mode is maintained beyond the second determination time. The selection unit does not transfer the mode from the first image stabilization mode to the second image stabilization mode while the determination by the second determination mode is maintained beyond third determination time that is shorter than the second determination time even when the determination by the first determination mode is maintained beyond the first determination time.

Accordingly, a second aspect of the present invention provides an image pickup apparatus provided with the image stabilization apparatus according to the first aspect.

Accordingly, a third aspect of the present invention provides a control method for an image stabilization apparatus equipped with a shake detection unit that detects a shake amount of an image pickup apparatus and an image stabilization unit that corrects an image blur using an output signal outputted from the shake detection unit, the control method comprising a selection step of selecting one image stabilization mode from among at least three image stabilization modes including a first image stabilization mode, a second image stabilization mode, and a third image stabilization mode, and a control step of controlling the image stabilization unit according to the image stabilization mode selected in the selection step. An image stabilization effect of the second image stabilization mode is larger than an image stabilization effect of the first image stabilization mode, and the image stabilization effect of the first image stabilization mode is larger than an image stabilization effect of the third image stabilization mode. A first determination mode that determines whether a state, where amplitude of the shake amount is not higher than a first threshold, is maintained beyond first determination time, is provided. A second determination mode that determines whether a state, where the amplitude of the shake amount is not higher than a second threshold that is smaller than the first threshold, is maintained beyond second determination time that is shorter than the first determination time is provided. The mode is transferred from the first image stabilization mode to the second image stabilization mode in the selection step when the determination by the first determination mode is maintained beyond the first determination time. The mode is transferred from the first image stabilization mode to the third image stabilization mode in the selection step when the determination by the second determination mode is maintained beyond the second determination time. The mode is not transferred from the first image stabilization mode to the second image stabilization mode in the selection step while the determination by the second determination mode is maintained beyond third determination time that is shorter than the second determination time even when the determination by the first determination mode is maintained beyond the first determination time.

Accordingly, a fourth aspect of the present invention provides an image stabilization apparatus comprising a shake detection unit configured to detect a shake amount of an image pickup apparatus, an image stabilization unit configured to correct an image blur using an output signal outputted from the shake detection unit, a selection unit configured to transfer a mode from a first image stabilization mode to a second image stabilization mode with a larger image stabilization effect when the detected shake amount is maintained below a first threshold beyond first determination time and the shake amount is not maintained below a second threshold that is lower than the first threshold beyond third determination time that is shorter than second determination time, and to transfer the mode from the first image stabilization mode to a third image stabilization mode with the smallest image stabilization effect when the shake amount is maintained below the second threshold beyond the second determination time that is shorter than the first determination time, and a control unit configured to control the image stabilization unit in the selected image stabilization mode.

Accordingly, a fifth aspect of the present invention provides a control method for an image stabilization apparatus equipped with a shake detection unit that detects a shake amount of an image pickup apparatus and an image stabilization unit that corrects an image blur using an output signal outputted from the shake detection unit, the control method comprising a first selection step of transferring a mode from a first image stabilization mode to a second image stabilization mode with a larger image stabilization effect when the shake amount is maintained below a first threshold beyond first determination time and the shake amount is not maintained below a second threshold that is lower than the first threshold beyond third determination time that is shorter than second determination time, a second selection step of transferring the mode from the first image stabilization mode to a third image stabilization mode with the smallest image stabilization effect when the shake amount is maintained below the second threshold beyond the second determination time that is shorter than the first determination time, and a control step of controlling the image stabilization unit in the selected image stabilization mode.

According to the present invention, when a condition to transfer to the second image stabilization mode from the first image stabilization mode occurs under a condition where the first image stabilization mode is selected as the selected image stabilization mode, it is monitored whether the apparatus will enter the third image stabilization mode or not in a predetermined time period, and the second image stabilization mode is not selected as the selected image stabilization mode where there is a possibility to enter the third image stabilization mode. This is able to prevent change of a field angle due to unnecessary transition of the image stabilization mode.

Further features of the present invention will become apparent from the following description of exemplary embodiments with reference to the attached drawings.

DESCRIPTION OF THE EMBODIMENTS

First Embodiment

Hereafter, an example of an image pickup apparatus equipped with an image stabilization apparatus according to a first embodiment of the present invention will be described with reference to the drawings.

Figure 1:
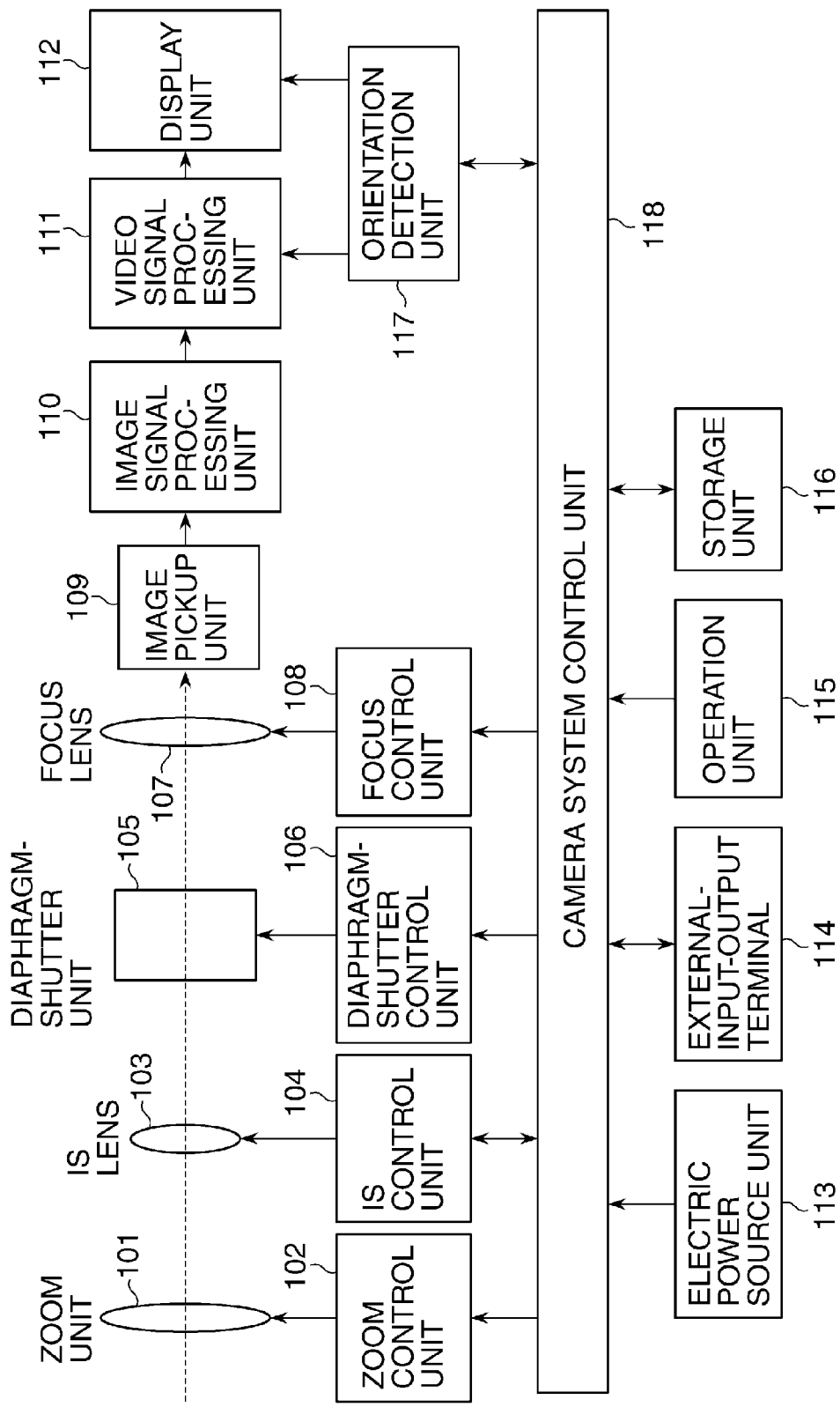
FIG. 1 is a block diagram schematically showing a configuration of an example of an image pickup apparatus equipped with an image stabilization apparatus according to a first embodiment of the present invention.

FIG. 1 is a block diagram schematically showing a configuration of an example of the image pickup apparatus equipped with the image stabilization apparatus according to the first embodiment of the present invention.

The illustrated image pickup apparatus is a digital still camera (referred to as a camera, hereafter), and may have a video shooting function. The camera is provided with a zoom unit 101 as a part of a taking lens unit that constitutes an image formation optical system. This zoom unit has a zoom lens 101 that changes magnification of the lens.

A zoom control unit 102 drives and controls the zoom unit 101 under control of a camera system control unit (referred to as a control unit, hereafter) 118. An image stabilizing lens (IS lens) 103, which is used as a correction member, is arranged movable in a direction that intersects perpendicularly to an optical axis of the taking lens unit (a direction that intersects the optical axis), and corrects an optical image that enters from the taking lens unit (an imaging optical system). An image stabilization (IS) control unit 104 drives and controls the image stabilizing lens 103 under control of the control unit 118.

A diaphragm-shutter unit 105 is a mechanical shutter having a diaphragm function. A diaphragm-shutter control unit 106 drives the diaphragm-shutter unit 105 under control of the control unit 118. A focus lens 107 is a part of the taking lens unit, and can change its position along the optical axis of the taking lens unit. A focus control unit 108 drives the focus lens 107 under control of the control unit 118.

An image pickup unit 109 converts an optical image that enters through the taking lens into an electrical signal (an analog image signal) for a pixel unit using an image pickup device like a CCD image sensor or a CMOS image sensor. An image signal processing unit 110 applies A/D conversion, correlation double sampling, gamma correction, white balance correction, color interpolation process, etc. to the analog image signal (i.e., the image signal) outputted from the image pickup unit 109, and outputs a video signal (image data).

A video signal processing unit 111 processes the video signal outputted from the image signal processing unit 110 according to its purpose. For example, the video signal processing unit 111 generates video for displaying according to the video signal. Furthermore, the video signal processing unit 111 applies an encoding process to the video signal, and generates a data file.

A display unit 112 displays an image according to the video signal for displaying that is outputted from the video signal processing unit 111. An electric power source unit 113 supplies electric power to sections of the entire camera according to purposes thereof. An external-input-output terminal 114 can connect with an external apparatus. The camera exchanges a communication signal and a video signal with the external apparatus through the external-input-output terminal 114.

An operation unit 115 has buttons, switches, etc. for a user to give instructions to the camera. A storage unit 116 stores various kinds of data like a video signal.

An orientation detection unit 117 detects a orientation of the camera, and gives a detection result (an orientation detection signal) as orientation detection information to the video signal processing unit 111 and the display unit 112. The control unit 118 has a CPU, a ROM, and a RAM, for example. The CPU develops a control program stored in the ROM onto the RAM, and executes the program to control the entire camera.

The operation unit 115 is provided with a release button that turns on a first switch (SW1) and a second switch (SW2) in order according to a depressing amount. In this case, the first switch SW1 turns on with a half depression of the release button, and the second switch SW2 turns on with the full depression of the release button.

When the first switch SW1 turns on, the control unit 118 performs an autofocus detection by controlling the focus control unit 108 according to an AF evaluation value obtained based on the video signal that is outputted by the video signal processing unit 111 to the display unit 112, for example. Moreover, in order to obtain a suitable exposure, the control unit 118 performs an AE process by which an aperture value and a shutter speed are determined based on brightness information concerning a video signal and a predetermined program diagram.

When the second switch SW2 turns on, the control unit 118 takes a photograph based on the diaphragm value and the shutter speed that have been determined, and stores image data picked up by the image pickup unit 109 into the storage unit 116.

When displaying a through image obtained in a state where the release button is not depressed, the control unit 118 preliminarily determines an aperture value and a shutter speed based on the above mentioned brightness information concerning the video signal and the program diagram at a specified interval for still image shooting exposure.

Moreover, the operation unit 115 is provided with an image stabilization switch that selects an image stabilization control (image stabilization) mode. When the image stabilization mode is selected with an operation of the image stabilization switch, the control unit 118 controls the image stabilization control unit 104 to perform an image stabilization operation with the image stabilization control unit 104.

Furthermore, the operation unit 115 is provided with a mode selection switch that selects one of a still image shooting mode and a moving image shooting mode. The control unit 118 changes an operating condition of the image stabilization control unit 104 according to the selected shooting mode.

In addition, the operation unit 115 is provided with a reproduction mode selection switch for selecting a reproduction mode. The control unit 118 stops the image stabilization operation of the image stabilization control unit 104, when the reproduction mode is selected.

The operation unit 115 is provided with a magnification variation switch that instructs zoom magnification variation. When the zoom magnification variation is instructed through the magnification variation switch, the control unit 118 controls the zoom control unit 102 to drive and control the zoom unit 101 by the zoom control unit 102 so that the zoom unit 101 moves to the instructed zoom position.

The video signal processing unit 111 determines whether an orientation is portrait or landscape about a video signal based on orientation information sent from the orientation detection unit 117, and determines an image display orientation on the display unit 112.

Figure 2:
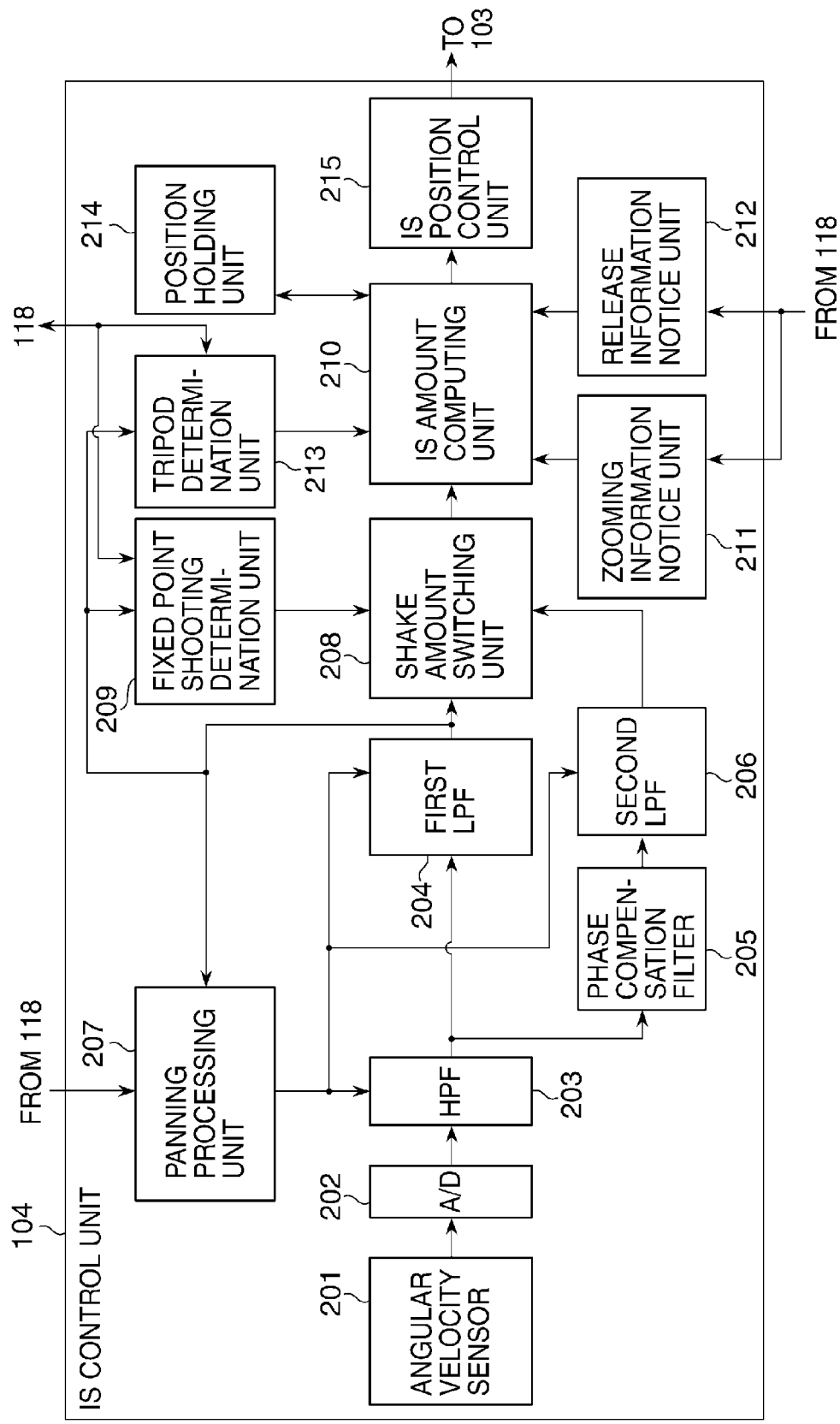
FIG. 2 is a block diagram schematically showing a configuration of an example of an image stabilization control unit shown in FIG. 1.

FIG. 2 is a block diagram schematically showing a configuration of an example of the image stabilization control unit 104 shown in FIG. 1.

The image stabilization control unit 104 is provided with an angular velocity sensor (it is also called a gyro sensor) 201 that detects an angular velocity corresponding to Corioli's force applied to the camera and outputs an angular velocity detection signal when the camera shakes (i.e., vibrates). This angular velocity detection signal is given to an A/D converter 202, and is converted into a digital signal (it is called an angular velocity signal).

It should be noted that the A/D converter 202 is unnecessary when the angular velocity sensor is provided with an interface for digital communications, such as an SPI (Serial Peripheral Interface).

The angular velocity signal that is outputted from the A/D converter 202 is given to a high-pass filter (HPF) 203. The HPF 203 cuts a low-frequency component (for example, DC component) of the angular velocity signal and outputs an HPF signal. Then, this HPF signal is given to an integrating filter (a first LPF) 204 and a phase compensation filter 205.

The integrating filter 204 integrates the HPF signal, and converts the angular velocity signal into an angle signal (this angle signal is called a first angle signal or a first shake amount, hereafter) that shows an angle (i.e., a shake amount). Then, this first angle signal is inputted into a shake amount switching unit 208.

The phase compensation filter 205 regulates phase lag and phase lead in the HPF signal, and generates a phase compensation signal. An integrating filter (a second LPF) 206 integrates the phase compensation signal, and converts the angular velocity signal into an angle signal (this angle signal is called a second angle signal or a second shake amount, hereafter) that shows a shake amount. Then, this second angle signal is inputted into the shake amount switching unit 208.

As mentioned above, the illustrated example finds the two shake amounts (the first shake amount and the second shake amount), and a process for finding the first shake amount is used for the image stabilization at the time of an EVF or the like, for example. On the other hand, a process for finding the second shake amount is used for the image stabilization in the above-mentioned fixed point shooting mode, for example, and strengthens the image stabilization effect in a band including a low frequency band for correcting a body shake etc.

A panning processing unit 207 changes cutoff frequencies of the HPF 203 and the integrating filters 204 and 206 according to a setting of a shooting mode or a control mode in response to the shake amount (the first shake amount in this case) under the control of the control unit 118.

It should be noted that the image stabilization amount and the position of the shift lens (i.e., the image stabilizing lens), for example, may be taken into consideration in addition to the shake amount when changing the cutoff frequency.

The shake amount switching unit 208 receives the first shake amount and the second shake amount, and outputs one of them as a selected shake amount. The shake amount switching unit 208 usually outputs the first shake amount as the selected shake amount to an image stabilization (IS) amount computing unit 210. On the other hand, when a fixed point shooting determination unit 209 determines that the shooting mode is the fixed point shooting mode, the shake amount switching unit 208 outputs the second shake amount as the selected shake amount to the image stabilization amount computing unit 210.

The image stabilization amount computing unit 210 finds an image stabilization amount according to the selected shake amount. In this case, the control unit 118 gives zooming information about the zoom (i.e., a position of the zoom unit 101) to the image stabilization amount computing unit 210 through a zooming information notice unit 211. Furthermore, the control unit 118 gives release information about the release switch to the image stabilization amount computing unit 210 through a release information notice unit 212.

Then, the image stabilization amount computing unit 210 computes the image stabilization amount according to the selected shake amount while taking the zooming information and the release information into consideration, and obtains the position (shift position) of the image stabilizing lens 103 corresponding to the image stabilization amount concerned.

It should be noted that the focal length varies according to the position (zoom position) of the zoom unit 101, and this changes sensitiveness of the image stabilizing lens 103. Furthermore, since the movable range for image stabilization of the image stabilizing lens 103 varies according to the focal length, the zooming information is used when computing the image stabilization amount. Moreover, since the movable range for image stabilization of the image stabilizing lens 103 varies according to the shooting condition in response to an operation of the release switch, the release information is used when computing the image stabilization amount.

As illustrated, a tripod determination unit 213 is connected to the image stabilization amount computing unit 210. When the tripod determination unit 213 determines that the current mode is a tripod mode based on the shake amount (the first shake amount in this case), the image stabilization amount computing unit 210 stops computing the image stabilization amount. Then, the image stabilization amount computing unit 210 records the shift position (the position of the image stabilizing lens 103) at the time of stopping the computation of the image stabilization amount on a position holding unit 214.

When the tripod determination unit 213 determines that the current mode is not the tripod mode, the image stabilization amount computing unit 210 resumes the computation of the image stabilization amount. In this case, the image stabilization amount is computed based on the shift lens position recorded on the position holding unit 214.

When receiving the shift position (i.e., the image stabilization position), an image stabilization (IS) position control unit 215 drives and controls the image stabilizing lens 103 according to the received shift position in the direction that intersects the optical axis. It should be noted that the image stabilization position control unit 215 drives and controls the image stabilizing lens 103 by a PID control, for example.

Figure 3:
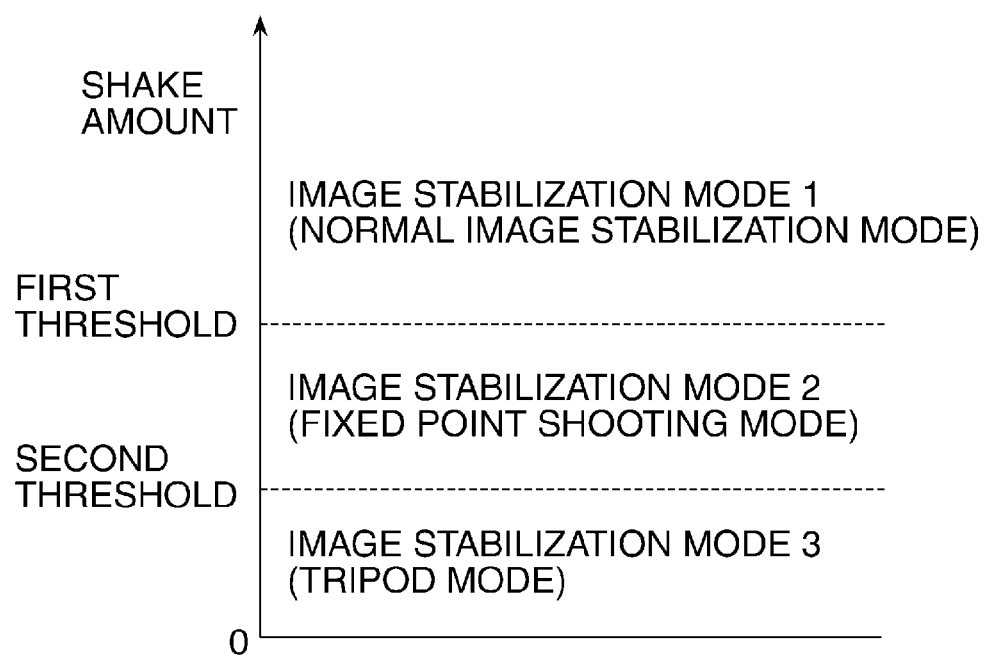
FIG. 3 is a view showing relations between shake amounts and image stabilization modes in the image pickup apparatus shown in FIG. 1.

FIG. 3 is a view showing relations between camera shake amounts and image stabilization modes in the camera shown in FIG. 1.

When the camera shake amount (the first shake amount in this case) exceeds a first threshold, the fixed point shooting determination unit 209 selects a first image stabilization mode (an image stabilization mode 1: a normal image stabilization mode). This first image stabilization mode is selected in the cases, such as an EVF, still image shooting, and video shooting. When the camera is started, the fixed point shooting determination unit 209 performs the image stabilization in the first image stabilization mode.

It should be noted that the shake amount switching unit 208 selects the first shake amount as the selected shake amount in the first image stabilization mode, as mentioned above.

Next, when the camera shake amount exceeds a second threshold and is not higher than the first threshold (the first threshold>the second threshold), the fixed point shooting determination unit 209 determines that the camera is firmly held, and selects a second image stabilization mode (an image stabilization mode 2: a fixed point shooting mode). The second image stabilization mode (it is also called the second image stabilization mode) is effective to improve image quality by correcting a hand shake substantially to stop movement of a subject image due to the hand shake when a long distance subject is shot during video recording under the state where the zoom lens 101 is positioned at the side of the telephoto end.

In this fixed point shooting mode, since the image stabilization covers a low frequency range, the image stabilizing lens 103 will move to a movable limit easily when the shake amount is large. Accordingly, it is desirable to apply this mode when the shake amount is small, such as a case where the camera is firmly held.

Since the image stabilizing lens 103 is easy to reach the movable limit in the fixed point shooting mode, the position of the image stabilizing lens may be used as a condition for determining the fixed point shooting mode in addition to the shake amount.

When the camera shake amount is not higher than the second threshold, the tripod determination unit 213 determines that the camera is fixed to a tripod or is placed on a desk etc., and selects a third image stabilization mode (an image stabilization mode 3: a tripod mode). Then, the tripod determination unit 213 stops computing the image stabilization amount by the image stabilization amount computing unit 210 as mentioned above.

That is, when the camera shake amount is not higher than the second threshold, the tripod determination unit 213 determines that the image stabilization is unnecessary because of the small shake amount, and transfers to the tripod mode in which the position of the image stabilizing lens 103 is fixed. In this tripod mode (it is also called the third image stabilization mode), inconvenience of erroneously correcting the low frequency noise of the angular velocity sensor 201 is prevented.

As mentioned above, the selected image stabilization mode differs according to the shake amount. Furthermore, when the mode is changed to either of the first, second, and third image stabilization modes, the change is performed according to a time period (determination time) during which the camera shake amount falls within the range specified by the first and second thresholds.

Figure 4:
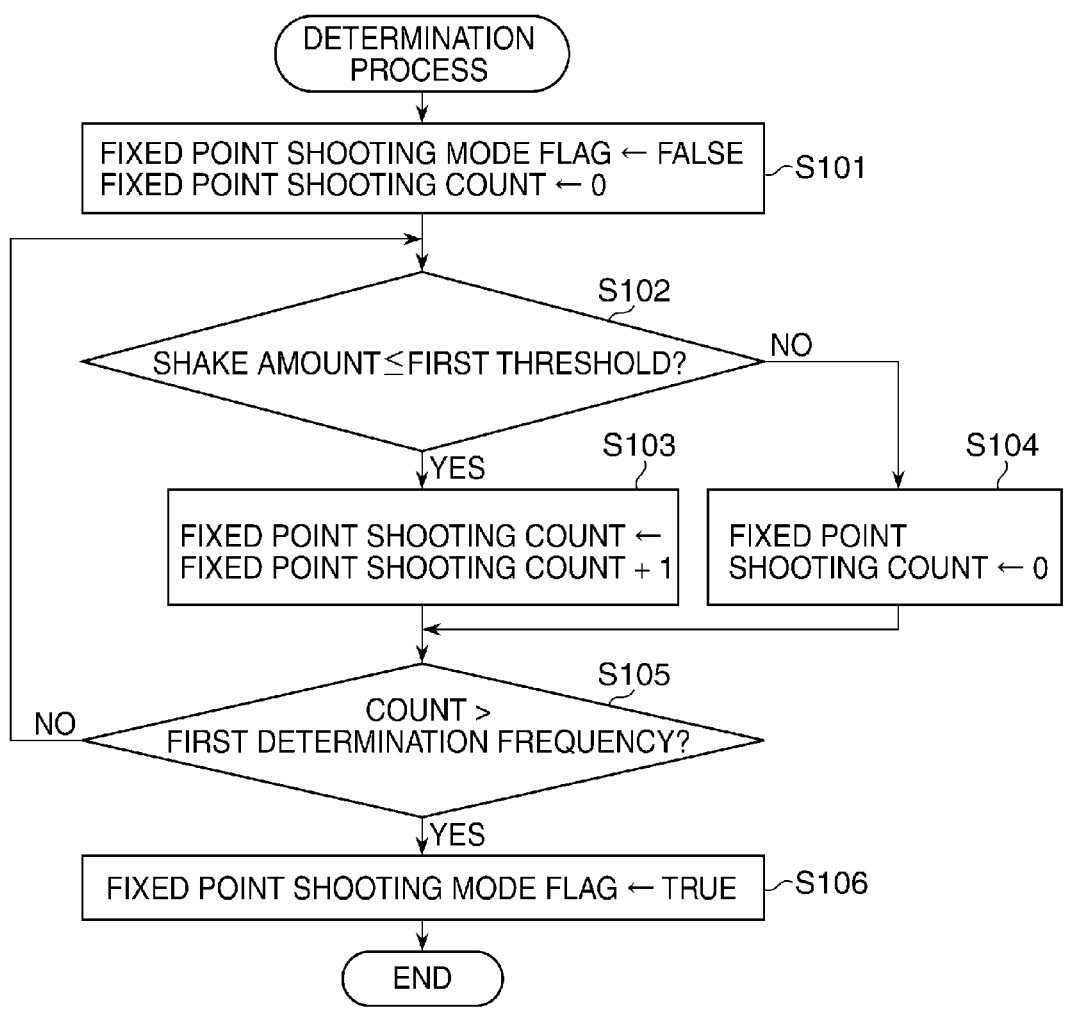
FIG. 4 is a flowchart for describing a determination process executed by a fixed point shooting determination unit shown in FIG. 2.

FIG. 4 is a flowchart for describing a determination process executed by the fixed point shooting determination unit 209 shown in FIG. 2. It should be noted that the process of the illustrated flowchart is executed under the control by the control unit 118.

In the following description, the camera shake amount (the first shake amount in this case) shall exceed the first threshold, the first image stabilization mode (the normal image stabilization mode) shall be selected by the fixed point shooting determination unit 209, and the first shake amount shall be selected by the shake amount switching unit 208 as the selected shake amount.

When starting the determination process, the fixed point shooting determination unit 209 sets a fixed point shooting mode flag to FALSE, and sets the fixed point shooting count to "0" (step S101). Next, the fixed point shooting determination unit 209 determines whether the camera shake amount is not higher than the first threshold (step S102).

When the camera shake amount is not higher than the first threshold (YES in the step S102), the fixed point shooting determination unit 209 increments the fixed point shooting count by one (step S103). On the other hand, when the camera shake amount exceeds the first threshold (NO in the step S102), the fixed point shooting determination unit 209 clears the fixed point shooting count to "0" (step S104).

In this case, the first threshold is desirable to be set so that the fixed point shooting count increases when the camera is firmly held and is cleared to zero when the camera is moved or a panning operation is performed.

It should be noted that the fixed point shooting determination unit 209 determines whether the camera shake amount is not higher than the first threshold at predetermined intervals (for example, in 5-millisecond periods).

Following the process in the step S103 or S104, the fixed point shooting determination unit 209 determines whether the fixed point shooting count is larger than a predetermined first determination frequency (step S105). When the fixed point shooting count is larger than the first determination frequency (YES in the step S105), the fixed point shooting determination unit 209 determines that the shake amount has been small during a specified period, and sets the fixed point shooting mode flag to TRUE (step S106).

As a result of this, the shake amount switching unit 208 selects the second shake amount as the selected shake amount. Then, the fixed point shooting determination unit 209 finishes the determination process. On the other hand, when the fixed point shooting count is not larger than the first determination frequency (NO in the step S105), the fixed point shooting determination unit 209 returns the process to the step S102, and determines whether the shake amount is not higher than the first threshold.

Figure 5:
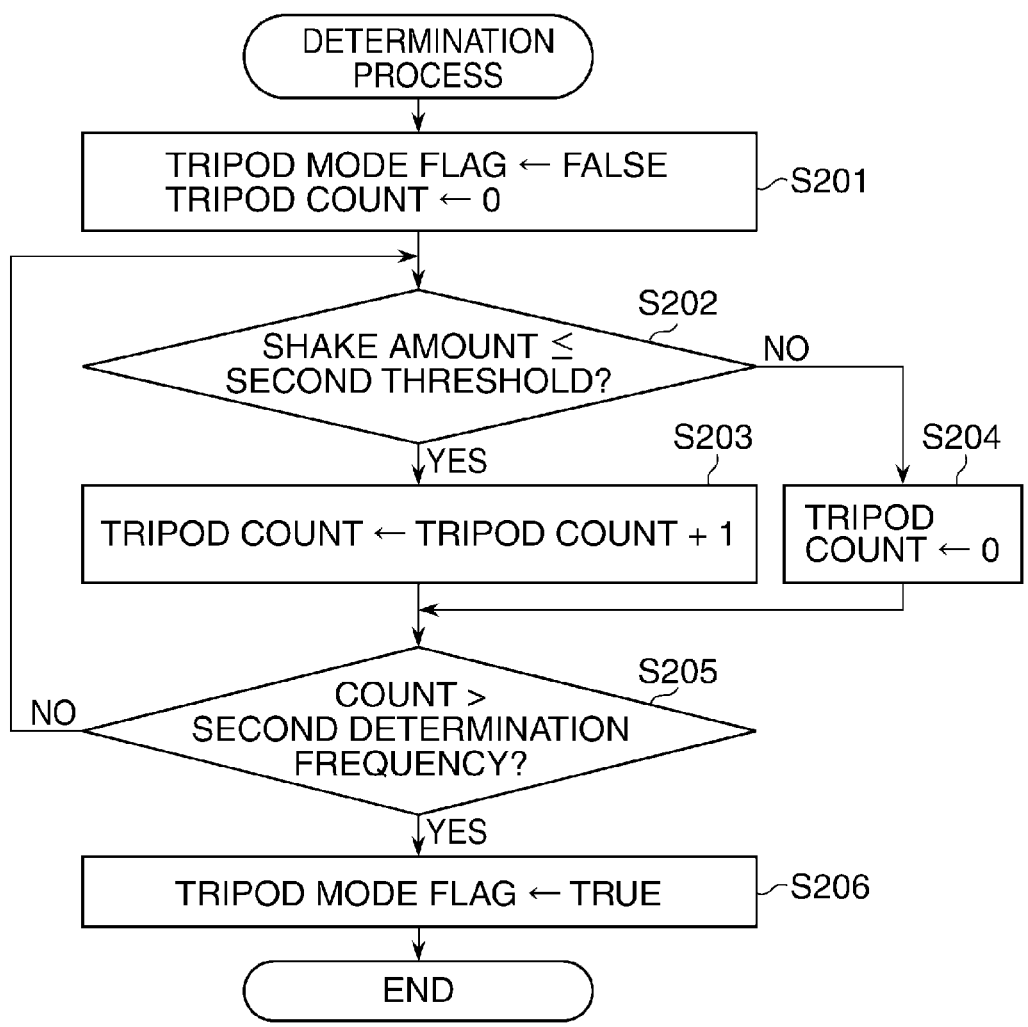
FIG. 5 is a flowchart for describing a determination process executed by a tripod determination unit shown in FIG. 2.

FIG. 5 is a flowchart for describing a determination process executed by the tripod determination unit 213 shown in FIG. 2. It should be noted that the process of the illustrated flowchart is executed under the control by the control unit 118.

In the following description, the camera shake amount (the first shake amount in this case) shall exceed the second threshold, the first image stabilization mode (the normal image stabilization mode) or the second image stabilization mode (the fixed point shooting mode) shall be selected.

When starting the determination process first, the tripod determination unit 213 sets a tripod mode flag to FALSE, and sets the tripod count to "0" (step S201). Next, the tripod determination unit 213 determines whether the camera shake amount is not higher than the second threshold (step S202).

When the camera shake amount is not higher than the second threshold (YES in the step S202), the tripod determination unit 213 increments the tripod count by one (step S203). On the other hand, when the camera shake amount exceeds the second threshold (NO in the step S202), the tripod determination unit 213 clears the tripod count to "0" (step S204).

In this case, the second threshold is desirable to be set so that the tripod count increases when the camera is fixed or is placed on a desk etc. and is cleared to zero when the camera is held by hand.

It should be noted that the tripod determination unit 213 determines whether the camera shake amount is not higher than the second threshold at predetermined intervals (for example, in 5-millisecond periods).

Following the process in the step S203 or S204, the tripod determination unit 213 determines whether the tripod count is larger than a predetermined second determination frequency (step S205). When the tripod count is larger than the second determination frequency (YES in the step S205), the tripod determination unit 213 determines that the shake amount has been small during a specified period, and sets the tripod flag to TRUE (step S206).

As a result of this, the image stabilization amount computing unit 210 stops computing the image stabilization amount as mentioned above. Then, the tripod determination unit 213 finishes the determination process. On the other hand, when the tripod count is not larger than the second determination frequency (NO in the step S205), the tripod determination unit 213 returns the process to the step S202, and determines whether the shake amount is not higher than the second threshold.

It should be noted that the first threshold is higher than the second threshold because the fixed point shooting mode is set when the camera is firmly held and the tripod mode is set when the camera is fixed to a tripod or is placed on a desk.

Moreover, the fixed point shooting mode is set, when an image stabilization frequency band is expanded in order to strengthen the image stabilization effect at the low frequency and the image stabilization effect for an image blur in the entire frequency band is improved. Accordingly, when the fixed point shooting mode is set in a state where the camera shake amount is large, the image stabilizing lens 103 easily reaches the movable limit.

Accordingly, in this embodiment, the first determination frequency (time) is set so that the fixed point shooting mode is set when the camera shake amount is kept small in a specified period and so that the shake amount is determined as stably small. For example, the first determination frequency is set to "600" that is equivalent to 3 seconds.

On the other hand, since the camera shake is small enough in the tripod mode, it can be determined whether the current mode is the tripod mode, even if the second determination frequency (time) is smaller than the first determination frequency. For example, the second determination frequency is set to "200" that is equivalent to 1 second. That is, the first determination frequency (time) is larger than the second determination frequency (time).

Incidentally, when the camera shake amount is relatively small and is not higher than the first threshold, the fixed point shooting count may exceed the first determination frequency. That is, the fixed point shooting mode may be set before the tripod mode is set.

For example, when the camera is put on a desk just after a panning operation, and the fixed point shooting mode is previously set before the tripod mode is set, the image stabilization effect of low frequency is strengthened in the image stabilization even though the camera is stably put on the desk.

As a result, since the image stabilization will be erroneously performed for a gentle variation of an image output due to a process after the panning operation, the field angle of a screen may vary.

As mentioned above, when the image stabilization mode is changed according to the camera shake amount while determining independently for every image stabilization mode, the optimal image stabilization mode may not be selected in some shake states of the camera.

In order to prevent such a situation, when determining whether to change the image stabilization mode using the lowest threshold (i.e., the second threshold), a determination unit does not select the image stabilization mode that is determined using a threshold that is higher than the lowest threshold concerned, in this embodiment.

Figure 6:
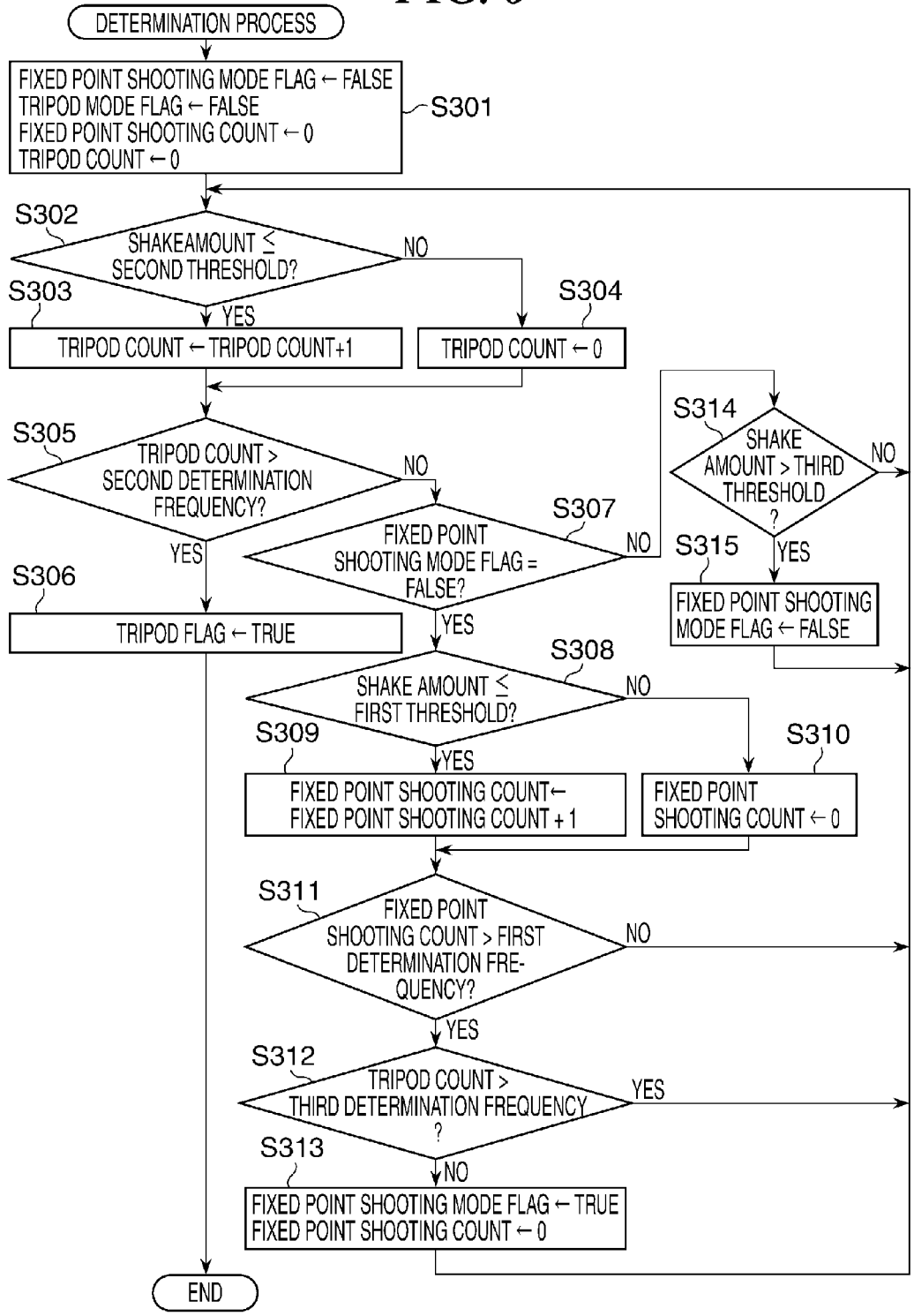
FIG. 6 is a flowchart for describing a mode determination process executed by the camera shown in FIG. 1.

FIG. 6 is a flowchart for describing a mode determination process executed by the camera shown in FIG. 1. It should be noted that the process of the illustrated flowchart is executed under the control by the control unit 118.

When the camera is started, the control unit 118 sets the image stabilization mode to the first image stabilization mode (the normal image stabilization mode), and makes the image stabilization control unit 104 perform the image stabilization using the image stabilizing lens 103. Then, the fixed point shooting determination unit 209 sets the fixed point shooting mode flag to FALSE, and sets the fixed point shooting count to "0" under control of the control unit 118 (step S301). In the same manner, the tripod determination unit 213 sets the tripod mode flag to FALSE, and sets the tripod count to "0".

Next, the tripod determination unit 213 determines whether the camera shake amount (the first shake amount) is not higher than the second threshold under the control of the control unit 118 (step S302). When the camera shake amount is not higher than the second threshold (YES in the step S302), the tripod determination unit 213 increments the tripod count by one (step S303).

On the other hand, when the camera shake amount exceeds the second threshold (NO in the step S302), the tripod determination unit 213 clears the tripod count to "0" (step S304).

Following the process in the step S303 or S304, the tripod determination unit 213 determines whether the tripod count is larger than the second determination frequency (step S305). That is, the tripod determination unit 213 determines whether the state where the shake amount is not higher than the second threshold is maintained beyond second determination time.

When the tripod count is larger than the second determination frequency (YES in the step S305), the tripod determination unit 213 determines that the shake amount has been small during a specified period, and sets the tripod flag to TRUE (step S306). That is, the tripod mode (the third image stabilization mode) is selected as the selected image stabilization mode.

As a result of this, the image stabilization amount computing unit 210 stops computing the image stabilization amount. Then, the control unit 118 finishes the determination process.

On the other hand, when the tripod count is not higher than the second determination frequency (NO in the step S305), the control unit 118 determines whether the fixed point shooting mode flag in the fixed point shooting determination unit 209 is FALSE (step S307).

When the fixed point shooting mode flag is FALSE (YES in the step S307), the control unit 118 makes the fixed point shooting determination unit 209 determine whether the shake amount is not higher than the first threshold (step S308). When the shake amount is not higher than the first threshold (YES in the step S308), the fixed point shooting determination unit 209 increments the fixed point shooting count by one under the control of the control unit 118 (step S309).

On the other hand, when the camera shake amount exceeds the first threshold (NO in the step S308), the fixed point shooting determination unit 209 clears the fixed point shooting count to "0" under the control of the control unit 118 (step S310).

Following the process in the step S309 or S310, the fixed point shooting determination unit 209 determines whether the fixed point shooting count is larger than the first determination frequency (step S311). That is, the fixed point shooting determination unit 209 determines whether the state where the shake amount exceeds the first threshold is maintained beyond first determination time.

When the fixed point shooting determination unit 209 determines that the fixed point shooting count is larger than the first determination frequency (YES in the step S311), the control unit 118 makes the tripod determination unit 213 determine whether the tripod count is larger than a third determination frequency (step S312). That is, the control unit 118 makes the tripod determination unit 213 determine whether the state where the shake amount is not higher than the second threshold is maintained beyond third determination time.

The first determination frequency is larger than the second determination frequency that is larger than the third determination frequency. For example, when the second determination frequency is set to "200" that is equivalent to 1 second, the third determination frequency is set to "50" that is equivalent to 250 milliseconds.

When the tripod determination unit 213 determines that the tripod count is not larger than the third determination frequency (NO in the step S312), the control unit 118 assumes that there is still low possibility to set the tripod mode, and makes the fixed point shooting determination unit 209 set the fixed point shooting mode flag to TRUE and clear the fixed point shooting count to "0" (step S313).

As a result of this, the fixed point shooting mode (the second image stabilization mode) is set up, and the shake amount switching unit 208 selects the second shake amount as the selected shake amount. Then, the control unit 118 returns the process to the step S302, and makes the tripod determination unit 213 determine whether the shake amount is not higher than the second threshold.

When the tripod determination unit 213 determines that the tripod count exceeds the third determination frequency (YES in the step S312), the control unit 118 returns the process to the step S302, and makes the tripod determination unit 213 determine whether the shake amount is not higher than the second threshold.

When the fixed point shooting determination unit 209 similarly determines that the fixed point shooting count is not larger than the first determination frequency (NO in the step S311), the control unit 118 returns the process to the step S302, and makes the tripod determination unit 213 determine whether the shake amount is not higher than the second threshold.

When the fixed point shooting mode flag is not FALSE (NO in the step S307, i.e., the flag is TRUE), the control unit 118 makes the fixed point shooting determination unit 209 determine whether the shake amount exceeds a third threshold (step S314). In this case, the third threshold is set to be higher than the first threshold in order to give hysteresis (the third threshold>the first threshold). Although the third threshold is larger than the first threshold in order to give hysteresis in this embodiment, the third threshold may be equal to the first threshold.

When the shake amount exceeds the third threshold (YES in the step S314), the fixed point shooting determination unit 209 sets the fixed point shooting mode flag to FALSE (step S315). As a result of this, the normal image stabilization mode is set, and the shake amount switching unit 208 selects the first shake amount as the selected shake amount. Then, the control unit 118 returns the process to the step S302, and makes the tripod determination unit 213 determine whether the shake amount is not higher than the second threshold.

When the shake amount is not higher than the third threshold (NO in the step S314), the control unit 118 returns the process to the step S302, and makes the tripod determination unit 213 determine whether the shake amount is not higher than the second threshold.

As mentioned above, it is determined whether the count about the image stabilization mode corresponding to the smallest threshold (the tripod mode) exceeds the predetermined frequency (the third determination frequency) in the process shown in FIG. 6. Then, when the tripod mode may be set because the count exceeds the predetermined frequency, the fixed point shooting mode is not set. That is, when the tripod mode that targets a small shake amount may be set, priority is given to the tripod mode that targets a small shake amount without entering the fixed point shooting mode that targets a shake amount that is larger than the shake amount that is targeted by the tripod mode concerned.

When there are two image stabilization modes (the fixed point shooting mode and the tripod mode in the illustrated example) that have different thresholds (shake amount thresholds), and when the count considered when the image stabilization mode determined with the lower shake amount threshold exceeds a specified frequency, the process stands by without setting the image stabilization mode determined with the higher shake amount threshold, which prevents unnecessary transition of the image stabilization mode.

In the different two image stabilization modes, although the above-mentioned embodiment describes the fixed point shooting mode, which expands the image stabilization frequency band in order to strengthen the image stabilization effect at the low frequency, as the image stabilization mode with high image stabilization effect, a control gain for the image stabilizing lens may be increased as another example for increasing the image stabilization effect. Increase of the control gain improves a tracking performance to a target lens position, which can further improve the image stabilization effect. Moreover, the expansion of the image stabilization frequency band may be combined with the increase of the control gain.

When there are three or more image stabilization modes having different shake amount thresholds, it is determined for every image stabilization mode whether an image stabilization mode with a lower shake amount threshold than a standard image stabilization mode may be set. Then, when an image stabilization mode with a lower shake amount threshold may be set, the process stands by temporarily. Moreover, it is possible to monitor only the image stabilization mode with the lowest shake amount threshold.

When a large shake amount is detected in a state where an image stabilization mode with a low shake amount threshold is set and the apparatus exits from the current image stabilization mode, the apparatus transfers to the image stabilization mode that targets a state where the shake amount is largest. In the example shown in FIG. 3, when detecting a large shake amount in the tripod mode or the fixed point shooting mode, the mode transfers to the normal image stabilization mode.

Thus, in the embodiment of the present invention, when an image stabilization mode is selected from among a plurality of image stabilization modes corresponding to a shake amount of an image pickup apparatus, change of a field angle due to unnecessary transition of the image stabilization mode can be prevented.

As mentioned above, in the example shown in FIG. 1 and FIG. 2, the system control unit 118, the fixed point shooting determination unit 209, and the tripod determination unit 213 function as the selection unit, and the camera system control unit 118, the image stabilization amount computing unit 210, and the image stabilization position control unit 215 function as the control unit. In the example shown in FIG. 1, the image stabilizing lens 103, the image stabilization control unit 104, and the camera system control unit 118 constitute the image stabilization apparatus at least.

Second Embodiment

The first embodiment describes the optical image stabilization that corrects an image blur by driving the taking lens. There is electronic image stabilization that segments an image of video in a direction to cancel an image blur and outputs the image. At this time, a larger image stabilization effect can be obtained by employing both the optical image stabilization and the electronic image stabilization so as to respond a larger image blur.

In the second embodiment, the image stabilization employing both the optical image stabilization and the electronic image stabilization will be described. Hereinafter, an example of an image pickup apparatus equipped with an image stabilization apparatus according to the second embodiment will be described in detail. In the following description, descriptions for components that have the same configurations as the first embodiment are omitted.

Figure 7:
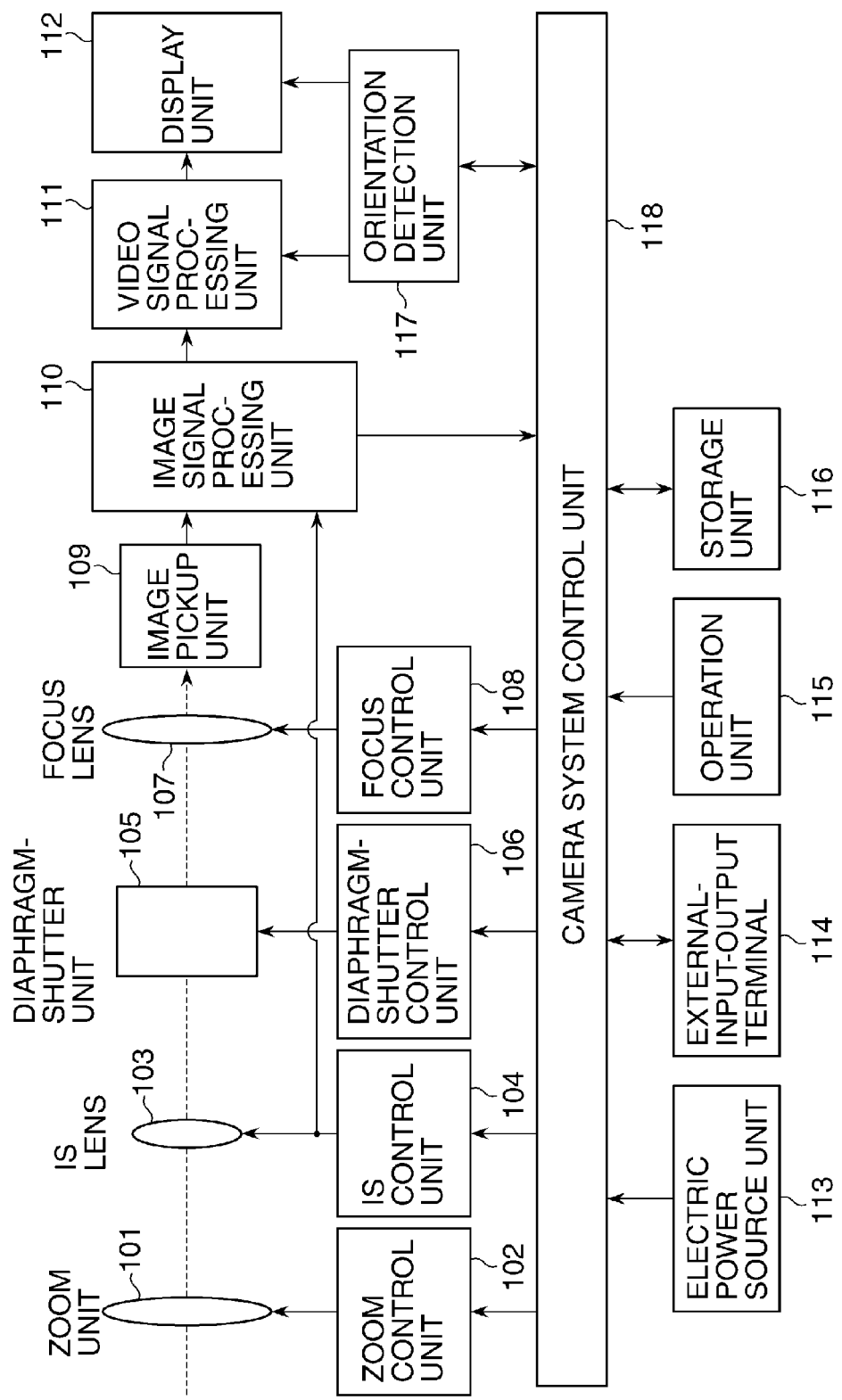
FIG. 7 is a block diagram schematically showing a configuration of an example of an image pickup apparatus equipped with an image stabilization apparatus according to a second embodiment of the present invention.

FIG. 7 is a block diagram schematically showing a configuration of an example of an image stabilization control unit 104 shown in FIG. 1 according to the second embodiment of the present invention.

The image signal processing unit 110 converts an electrical signal outputted from the image pickup unit 109 to a video signal, and changes the segmenting position of the video signal according to the correction amount of the image stabilization control unit 104.

Figure 8:
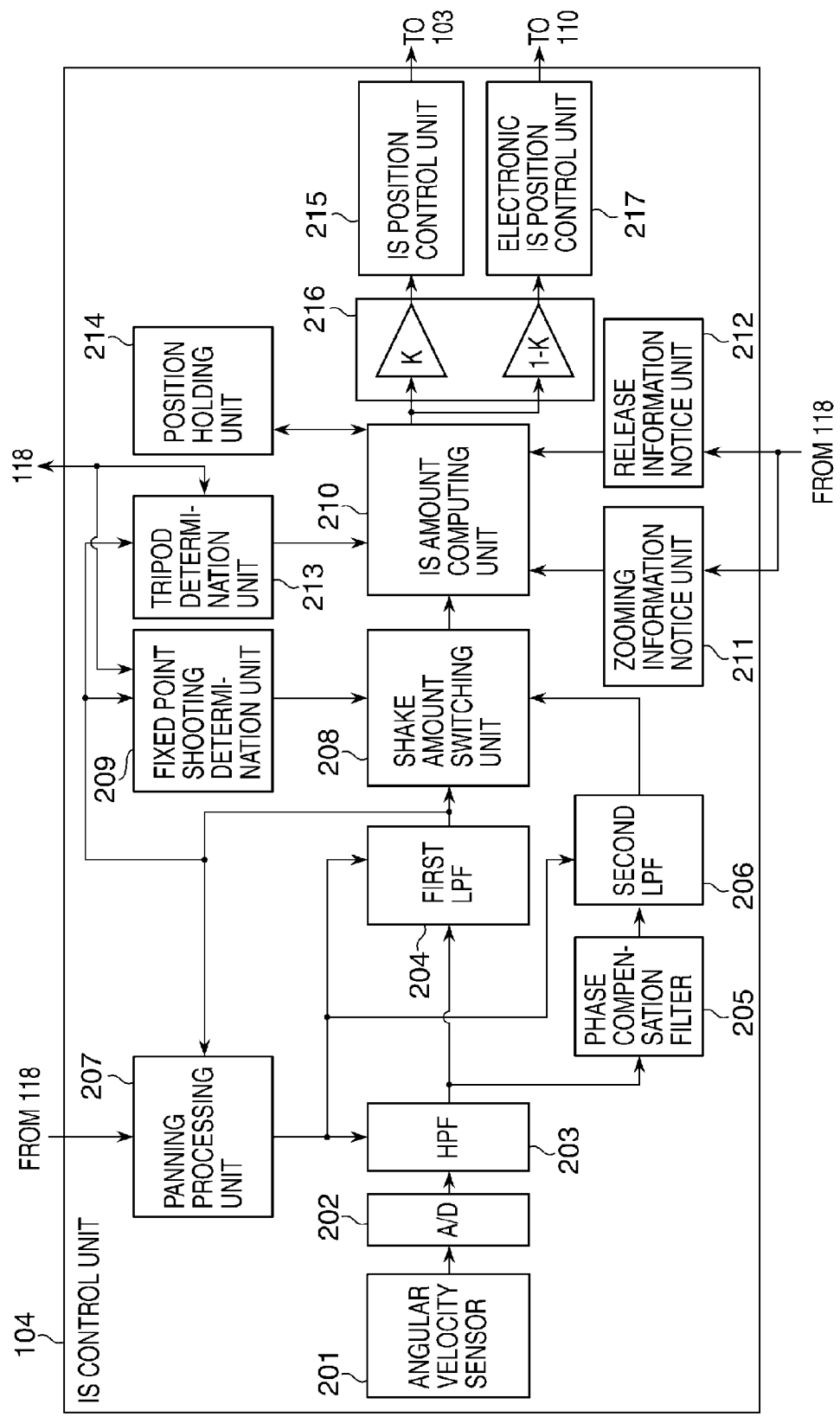
FIG. 8 is a block diagram schematically showing a configuration of an example of an image stabilization control unit shown in FIG. 7.

FIG. 8 is a block diagram schematically showing a configuration of the example of the image stabilization control unit 104 shown in FIG. 7.

In the second embodiment, two shake amounts (a first shake amount and a second shake amount) are computed like the first embodiment.

A camera shake is detected with the angular velocity sensor 201, and is given to the A/D converter 202. The angular velocity signal that is outputted from the A/D converter 202 is given to the high-pass filter (HPF) 203. The HPF 203 cuts a low-frequency component and outputs an HPF signal. Then, this HPF signal is given to the integrating filter (the first LPF) 204 and the phase compensation filter 205.

The integrating filter 204 integrates the HPF signal, and converts the angular velocity signal into an angle signal (the first shake amount) that shows an angle (a shake amount). Then, this first shake amount is inputted into the shake amount switching unit 208.

The phase compensation filter 205 regulates phase lag and phase lead in the HPF signal, and generates a phase compensation signal. The integrating filter (the second LPF) 206 integrates the phase compensation signal, and converts the angular velocity signal into an angle signal (the second shake amount) that shows a shake amount. Then, this second shake amount is inputted into the shake amount switching unit 208.

The shake amount switching unit 208 receives the first shake amount and the second shake amount, and outputs one of them as a selected shake amount. The shake amount switching unit 208 usually outputs the first shake amount as the selected shake amount to the image stabilization amount computing unit 210. On the other hand, when the fixed point shooting determination unit 209 determines that the shooting mode is the fixed point shooting mode, the shake amount switching unit 208 outputs the second shake amount as the selected shake amount to the image stabilization amount computing unit 210.

The image stabilization amount computing unit 210 calculates an image stabilization amount in consideration of zooming information and release information according to the selected shake amount. When the tripod determination unit 213 determines that the current mode is the tripod mode, the image stabilization amount computing unit 210 stops the computation of the image stabilization amount.

In this case, the determination for the fixed point shooting mode and the determination for the tripod mode can be performed by the same method as the first embodiment.

An image stabilization amount division unit 216 divides the image stabilization amount computed by the image stabilization amount computing unit 210 into two components in a ratio of "K:1−K" (0<K<1, K is called a division coefficient). The upper one multiplies the image stabilization amount by K, and gives to the image stabilization position control unit 215 as the image stabilization amount for the optical image stabilization. The lower one multiplies the image stabilization amount by 1−K, and gives to an electronic image stabilization position control unit 217 as a correction amount of the electronic image stabilization.

The electronic image stabilization position control unit 217 converts the image stabilization amount into a segmenting pixel amount that is an amount of the electronic image stabilization, notifies it to the image signal processing unit 110, and determines the segmenting position of the image.

Next, the calculation method for the division coefficient K used in the image stabilization amount division unit 216 will be described.

When the image stabilizing lens 103 moves within a movable range A of the optical image stabilization, and when the electronic image stabilization moves within a movable range B, the entire image stabilization can correct an image blur corresponding to the shake angle "A+B". At this time, the division coefficient K is calculated as follows.

$$K=A/(A+B)$$

When the movable range A of the optical image stabilization is 2 degrees, and when the movable range B of the electronic image stabilization is 2.5 degrees, the division coefficient K is 0.444 (K=2.0/(2.0+2.5)≈0.444).

In this case, an image blur that the image stabilization amount is multiplied by K=0.444 is corrected by the optical image stabilization (the image stabilizing lens), and an image blur that the image stabilization amount is multiplied by 1−K=0.556 is corrected by the electronic image stabilization (it segments and positions an image). Since the movable ranges A and B vary with zooming, respectively, the division coefficient K varies correspondingly.

Since the optical image stabilization and the electronic image stabilization are combined to perform the image stabilization as mentioned above, it becomes possible to correct a larger shake amount.

Third Embodiment

A third embodiment describes the case where the image stabilization is performed using the electronic image stabilization only.

A shake amount is detected with an angular velocity sensor, computations of two shake amounts (a first shake amount and a second shake amount) and determination of the tripod mode and determination of the fixed point shooting mode are performed in the same manner as the first embodiment and the second embodiment. Then, the image stabilization amount computed by the image stabilization amount computing unit 210 is given to the electronic image stabilization position control unit, and an image blur is corrected by the electronic image stabilization only.

Although the embodiments of the invention have been described, the present invention is not limited to the above-mentioned embodiments, the present invention includes various modifications as long as the concept of the invention is not deviated.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-164132, filed Aug. 7, 2013, and No.

2014-144216, filed Jul. 14, 2014, which are hereby incorporated by reference herein in their entireties.

What is claimed is:

1. An image stabilization apparatus comprising:
a shake detection unit configured to detect a shake amount of an image pickup apparatus;
an image stabilization unit configured to correct an image blur using an output signal outputted from said shake detection unit;
a selection unit configured to select one image stabilization mode from among at least three image stabilization modes including a first image stabilization mode, a second image stabilization mode, and a third image stabilization mode; and
a control unit configured to control said image stabilization unit according to the image stabilization mode selected by said selection unit,
wherein an image stabilization effect of the second image stabilization mode is larger than an image stabilization effect of the first image stabilization mode, and the image stabilization effect of the first image stabilization mode is larger than an image stabilization effect of the third image stabilization mode,
wherein a first determination mode that determines whether a state, where the shake amount is not higher than a first threshold, is maintained beyond first determination time is provided,
wherein a second determination mode that determines whether a state, where the shake amount is not higher than a second threshold that is smaller than the first threshold, is maintained beyond second determination time that is shorter than the first determination time is provided,
wherein said selection unit transfers the first image stabilization mode to the second image stabilization mode when the determination by the first determination mode is maintained beyond the first determination time,
wherein said selection unit transfers the first image stabilization mode to the third image stabilization mode when the determination by the second determination mode is maintained beyond the second determination time, and
wherein said selection unit does not transfer the first image stabilization mode to the second image stabilization mode while the determination by the second determination mode is maintained beyond third determination time that is shorter than the second determination time even when the determination by the first determination mode is maintained beyond the first determination time.

2. The image stabilization apparatus according to claim 1, wherein said selection unit transfers the first image stabilization mode to the third image stabilization mode when the determination by the second determination mode is maintained beyond the second determination time while the first determination mode is determined.

3. The image stabilization apparatus according to claim 1, wherein an image stabilization effect is a length of width of an image stabilization frequency band, the width of the image stabilization frequency band of the second image stabilization mode is longer than the width of the image stabilization frequency band of the first image stabilization mode, and the width of the image stabilization frequency band of the first image stabilization mode is longer than the width of the image stabilization frequency band of the third image stabilization mode.

4. The image stabilization apparatus according to claim 1, wherein the lower limit of the image stabilization frequency band of the second image stabilization mode is smaller than the lower limit of the image stabilization frequency band of the first image stabilization mode.

5. The image stabilization apparatus according to claim 1, wherein said control unit stops the image stabilization by said image stabilization unit when said selection unit selects the third image stabilization mode.

6. The image stabilization apparatus according to claim 1, wherein said selection unit transfers the second image stabilization mode to the first image stabilization mode when it is determined that the shake amount is not lower than a third threshold that is higher than the first threshold.

7. The image stabilization apparatus according to claim 1, wherein said selection unit transfers the third image stabilization mode to the first image stabilization mode when it is determined that the shake amount is not lower than a third threshold that is higher than the first threshold.

8. The image stabilization apparatus according to claim 6, wherein said selection unit transfers the first image stabilization mode to a panning mode, and increases cutoff frequency of a high-pass filter that extracts a specific frequency component from the output signal outputted from said shake detection unit, when it is determined that the shake amount is not lower than a fourth threshold that is higher than the third threshold.

9. An image pickup apparatus comprising:
a lens, and
an image stabilization apparatus comprising:
a shake detection unit configured to detect a shake amount of an image pickup apparatus;
an image stabilization unit configured to correct an image blur using an output signal outputted from said shake detection unit;
a selection unit configured to select one image stabilization mode from among at least three image stabilization modes including a first image stabilization mode, a second image stabilization mode, and a third image stabilization mode; and
a control unit configured to control said image stabilization unit according to the image stabilization mode selected by said selection unit,
wherein an image stabilization effect of the second image stabilization mode is larger than an image stabilization effect of the first image stabilization mode, and the image stabilization effect of the first image stabilization mode is larger than an image stabilization effect of the third image stabilization mode,
wherein a first determination mode that determines whether a state, where the shake amount is not higher than a first threshold, is maintained beyond first determination time is provided,
wherein a second determination mode that determines whether a state, where the shake amount is not higher than a second threshold that is smaller than the first threshold, is maintained beyond second determination time that is shorter than the first determination time is provided,
wherein said selection unit transfers the first image stabilization mode to the second image stabilization mode when the determination by the first determination mode is maintained beyond the first determination time,
wherein said selection unit transfers the first image stabilization mode to the third image stabilization mode when the determination by the second determination mode is maintained beyond the second determination time, and wherein said selection unit does not transfer the first image stabilization mode to the second image stabilization mode while the determination by the second determination mode is maintained beyond third determination time that is shorter than the second determination time even when the determination by the first determination mode is maintained beyond the first determination time.

10. A control method for an image stabilization apparatus equipped with a shake detection unit that detects a shake amount of an image pickup apparatus and an image stabilization unit that corrects an image blur using an output signal outputted from the shake detection unit, the control method comprising:
   a selection step of selecting one image stabilization mode from among at least three image stabilization modes including a first image stabilization mode, a second image stabilization mode, and a third image stabilization mode; and
   a control step of controlling the image stabilization unit according to the image stabilization mode selected in said selection step,
   wherein an image stabilization effect of the second image stabilization mode is larger than an image stabilization effect of the first image stabilization mode, and the image stabilization effect of the first image stabilization mode is larger than an image stabilization effect of the third image stabilization mode,
   wherein a first determination mode that determines whether a state, where the shake amount is not higher than a first threshold, is maintained beyond first determination time is provided,
   wherein a second determination mode that determines whether a state, where the shake amount is not higher than a second threshold that is smaller than the first threshold, is maintained beyond second determination time that is shorter than the first determination time is provided,
   wherein the first image stabilization mode is transferred to the second image stabilization mode in said selection step when the determination by the first determination mode is maintained beyond the first determination time,
   wherein the first image stabilization mode is transferred to the third image stabilization mode in said selection step when the determination by the second determination mode is maintained beyond the second determination time, and
   wherein the first image stabilization mode is transferred to the second image stabilization mode in said selection step while the determination by the second determination mode is maintained beyond third determination time that is shorter than the second determination time even when the determination by the first determination mode is maintained beyond the first determination time.

11. An image stabilization apparatus comprising:
   a shake detection unit configured to detect a shake amount of an image pickup apparatus;
   an image stabilization unit configured to correct an image blur using an output signal outputted from said shake detection unit;
   a selection unit configured to transfer a first image stabilization mode to a second image stabilization mode with a larger image stabilization effect when a state, where the shake amount is not higher than a first threshold, is maintained beyond first determination time and the shake amount is not maintained below a second threshold that is lower than the first threshold beyond third determination time that is shorter than second determination time, and to transfer the first image stabilization mode to a third image stabilization mode with the smallest image stabilization effect when a state, where the shake amount is not higher than the second threshold, is maintained beyond the second determination time that is shorter than the first determination time; and
   a control unit configured to control said image stabilization unit in the selected image stabilization mode.

12. A control method for an image stabilization apparatus equipped with a shake detection unit that detects a shake amount of an image pickup apparatus and an image stabilization unit that corrects an image blur using an output signal outputted from the shake detection unit, the control method comprising:
   a first selection step of transferring a first image stabilization mode to a second image stabilization mode with a larger image stabilization effect when a state, where the shake amount is not higher than a first threshold, is maintained beyond first determination time and the shake amount is not maintained below a second threshold that is lower than the first threshold beyond third determination time that is shorter than second determination time;
   a second selection step of transferring the first image stabilization mode to a third image stabilization mode with the smallest image stabilization effect when a state, where the shake amount is not higher than the second threshold, is maintained beyond the second determination time that is shorter than the first determination time; and
   a control step of controlling the image stabilization unit in the selected image stabilization mode.

13. An image stabilization apparatus comprising:
   a shake detection unit configured to detect a shake amount of an image pickup apparatus;
   an image stabilization unit configured to correct an image blur using an output signal outputted from said shake detection unit;
   a first count unit configured to perform a first count used for determining whether a first image stabilization mode is transferred to a second image stabilization mode that is larger in an image stabilization effect than the first image stabilization mode;
   a second count unit configured to perform a second count used for determining whether or not the first image stabilization mode is transferred to third image stabilization mode that is smaller in an image stabilization effect than the first image stabilization mode;
   a transfer unit configured to transfer the first image stabilization mode to the second stabilization mode, when the shake amount falls below a first threshold, and the first count unit starts the first count and subsequently the first count exceeds a first determination time while the shake amount is maintained below the first threshold during the first count unit performing the first count,
   wherein the transfer unit does not transfer the first image stabilization mode to the second stabilization mode, when the shake amount falls below a second threshold that is lower than the first threshold, and the second count unit starts the second count after the first count unit has started the first count, even when the first count exceeds the first determination time while the shake amount is maintained below the first threshold during the first count unit performing the first count.

14. The image stabilization apparatus according to claim 13, wherein the transfer unit does not transfer the first image stabilization mode to the second image stabilization mode when where the shake amount falls below the second threshold, and the second count is started after the first count has been started, and subsequently the second count exceeds third determination time that is shorter than second determination time while the shake amount is maintained below the second threshold during the second count unit performing the second count, wherein the second determination time is used for determining whether or not the first image stabilization mode is transferred to the third image stabilization mode.

15. A control method for an image stabilization apparatus equipped with a shake detection unit configured to detect a shake amount of an image pickup apparatus and an image stabilization unit configured to correct an image blur using an output signal outputted from said shake detection unit, the control method comprising:

a first count step of performing a first count used for determining whether or not a first image stabilization mode is transferred to a second image stabilization mode that is larger in an image stabilization effect than the first image stabilization mode;

a second count step of performing a second count used for determining whether or not the first image stabilization mode is transferred to third image stabilization mode that is smaller in an image stabilization effect than the first image stabilization mode;

a transfer step of transferring the first image stabilization mode to the second stabilization mode, when the shake amount falls below a first threshold, and the first count has been started and subsequently the first count exceeds a first determination time while the shake amount is maintained below the first threshold during the first count being performed, wherein the first image stabilization mode is not transferred to the second stabilization mode, when the shake amount falls below a second threshold that is lower than the first threshold, and the second count is started after the first count has been started, even when the first count exceeds the first determination time while the shake amount is maintained below the first threshold during the first count being performed.

* * * * *